W. HARKNESS.
Gas-Retort.

No. 161,410. Patented March 30, 1875.

UNITED STATES PATENT OFFICE.

WILLIAM HARKNESS, OF PROVIDENCE, RHODE ISLAND.

IMPROVEMENT IN GAS-RETORTS.

Specification forming part of Letters Patent No. 161,410, dated March 30, 1875; application filed January 6, 1875.

*To all whom it may concern:*

Be it known that I, WM. HARKNESS, of Providence, in the county of Providence and State of Rhode Island, have invented certain Improvements in Gas-Retorts, of which the following is a specification:

My invention relates to gas-retorts; and it consists of a retort having two circular flues covered by an arched flue, all extending lengthwise of the retort, and so connected by passages that the gas will travel through the entire series of flues, as hereinafter more fully explained.

Figure 1:
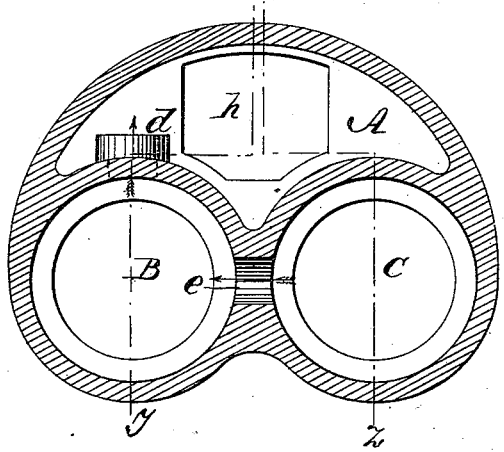
Figure 2:
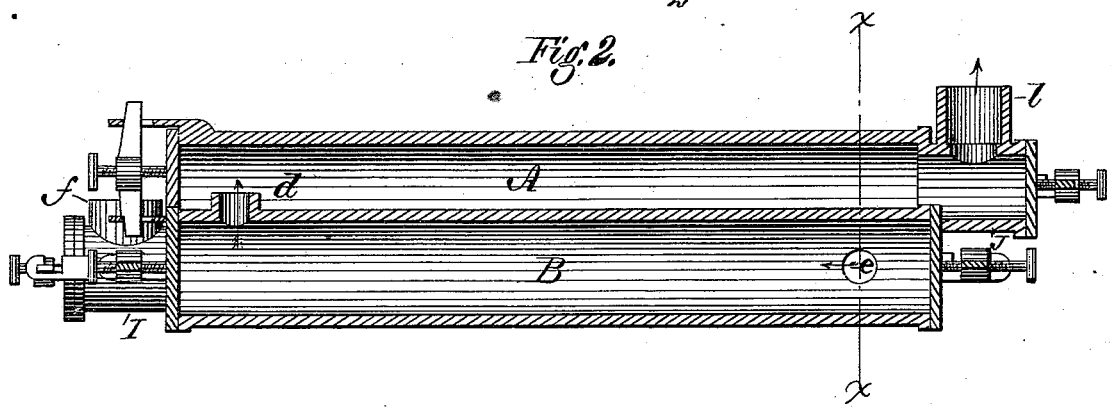
Figure 3:
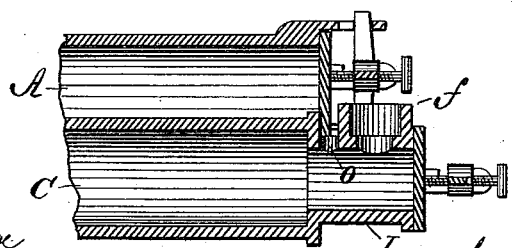

Figure 1 is a transverse vertical section on the line $xx$ of Fig. 2. Fig. 2 is a longitudinal section on the line $yy$ of Fig. 1, and Fig. 3 is a longitudinal section on the line $zz$ of Fig. 1.

My present invention has for its object the production of a compound retort, which can be cast complete, and in which the walls of the chambers shall be of such a form as to prevent their warping or fracturing by change of temperature, it being more especially intended for the manufacture of gas from hydrocarbons and steam, according to the process described in my patent of May 26, 1874, No. 151,283. The retort, as illustrated in Fig. 1, is made with two tubular chambers or flues, B and C, arranged side by side; and a chamber or flue, A, formed above these two by an extension of the outer walls of these two chambers, B C, in a circular line over the top of both, thereby inclosing the space between and over them, as shown in Fig. 1. The two chambers B and C are connected near one end by an opening or passage, $e$, as shown in Figs. 1 and 2, and the chambers B and A are connected in like manner by a passage, $d$, also shown in Figs. 1 and 2. The chamber A is provided at one end by a protruding neck, J, which has a collar, $l$, as shown in Fig. 2, for the attachment of a pipe. In like manner the chamber C is provided with a neck, I, at the opposite end of the retort, and this neck I is also provided with a collar $f$, as shown in Figs. 2 and 3. The neck I, as shown in Fig. 3, is also provided with a smaller opening, $o$, for the introduction of the hydrocarbon, though this may be formed after the retort is cast, if preferred.

Each of the chambers or tubes are provided at their opposite ends with lids, by which they may be closed, as illustrated in the drawings, though, if preferred, the lids may be secured by other means.

It will be seen that by this construction a series of chambers are formed, through all of which the gas is obliged to pass, and that all of the walls of said chambers are curved, so that when heated there will be no danger of their being cracked or broken by the expansion of the metal.

In use, the decomposed steam and the hydrocarbon are introduced through the neck I into the chamber C, along which the vapors pass, and, through the opening $e$, enter the chamber B, and, after passing along said chamber, then, through opening $d$, enter chamber A, and, passing along that, finally emerge through the pipe or collar $l$. The retort thus made can be cast complete in a single piece, with the openings $e$ and $d$ and the necks I and J, with their collars $l$ and $f$, thus being exceedingly simple and cheap to make, and avoiding the numerous joints usual in retorts for this purpose, and which are difficult to keep tight. When set for use, the ends, with the necks and lids, will all be outside of the furnace, so that the joints will not be subjected to great heat.

Having thus described my invention, what I claim is—

A gas-retort composed of the two circular chambers B C, arranged side by side, and the semicircular chamber A above the two former, with internal connecting-passages $e$ $d$, the whole being cast in a single piece, substantially as described.

WILLIAM HARKNESS.

Witnesses:
ROBERT THOMPSON,
CHAS. F. BALLOU.